Aug. 7, 1928. Re. 17,063

J. DRAPER

WASHING APPARATUS

Original Filed July 15, 1922 2 Sheets-Sheet 1

Inventor
James Draper

By his Attorneys
Sheffield & Betts.

Aug. 7, 1928. Re. 17,063

J. DRAPER

WASHING APPARATUS

Original Filed July 15, 1922 2 Sheets-Sheet 2

Inventor

James Draper

By his Attorneys

Sheffield & Betts.

Reissued Aug. 7, 1928. Re. 17,063

UNITED STATES PATENT OFFICE.

JAMES DRAPER, OF SAN JUAN, PORTO RICO.

WASHING APPARATUS.

Original No. 1,496,660, dated June 3, 1924, Serial No. 575,162, filed July 15, 1922. Application for reissue filed September 9, 1925. Serial No. 55,405.

This invention relates particularly to apparatus used in washing, boiling, rinsing and drying clothes and similar articles, and is so devised that all of said acts may be carried out in one machine without the necessity of transferring the articles from one type of apparatus to another, as has heretofore been necessary in commercial laundries where large quantities of wearing apparel and household goods are washed from day to day.

Briefly stated, the washing apparatus of the present invention comprises an outer casing, preferably cylindrical in form, having a door or closure at one or both ends. This casing is adapted to enclose a foraminous container for the clothes or articles to be washed and is so arranged that the same may be introduced longitudinally into the casing. Means are provided for rotating the foraminous container within the outer casing and suitable pipes are provided for supplying hot and cold water and steam to the interior of the casing. A pipe is also provided for producing a partial or substantial degree of vacuum within the casing. The casing is also provided with a suitable outlet for the withdrawal of the washing fluid and sediment.

The principal object of the present invention as accomplished by the above mentioned apparatus is to eliminate various devices and apparatus used at the present day in laundries of the kind above referred to. These devices include centrifugal extractors, clothes tumblers, driers and trucks which are used for carrying the wet articles being washed from one machine to another. It will also be appreciated that by combining all of the steps of washing and drying in a single apparatus the amount of manual labor required is greatly reduced and the wear and tear upon the linen is practically eliminated.

Furthermore, my improved apparatus economizes the floor space required in a particular plant, also reduces the amount of power consumed, and the danger from exposed shafting, belting, gears, etc.

Furthermore, the use of my improved apparatus prevents steam and foul odors from being present in the laundry or workrooms and in general simplifies the entire washing operation, making it cleaner, cooler and more sanitary.

One form of my apparatus which I at present deem preferably for carrying out my improved method of washing and drying is described as follows and fully illustrated in the accompanying drawings, in which.

Figure 1:
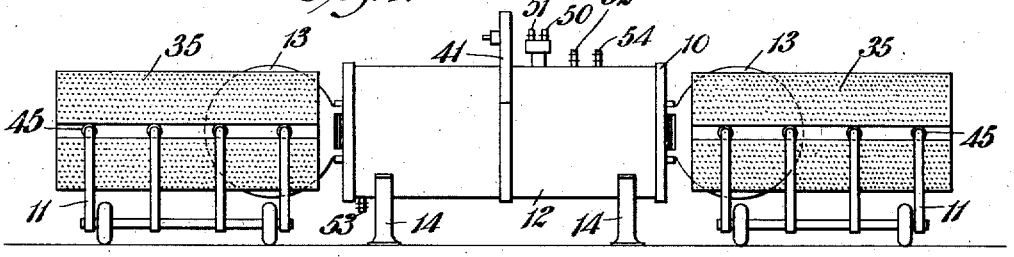
Fig. 1 is a diagrammatic view of the apparatus of the present invention illustrating the manner in which the clothes cylinders are introduced into and removed from the casing of the washing machine.
Figure 2:
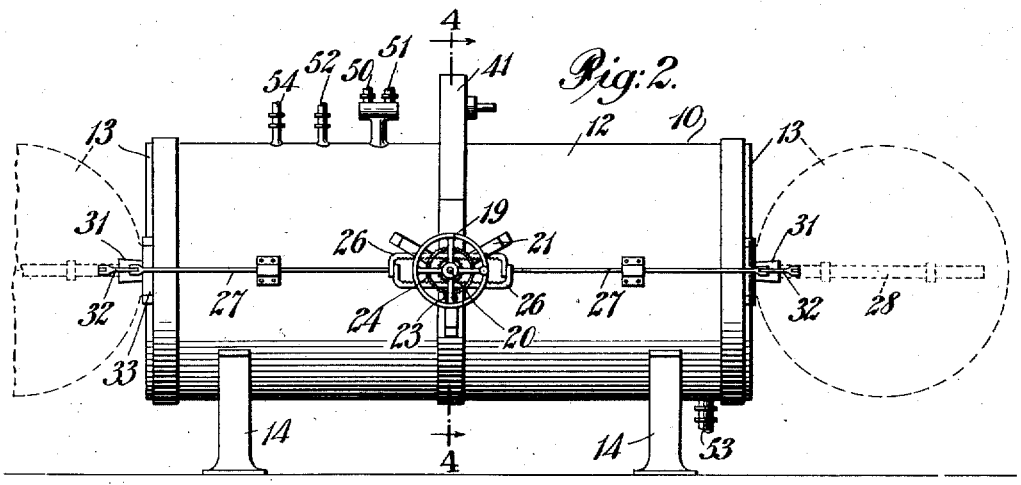
Fig. 2 is a side elevation of the said casing illustrated more in detail.
Figure 3:
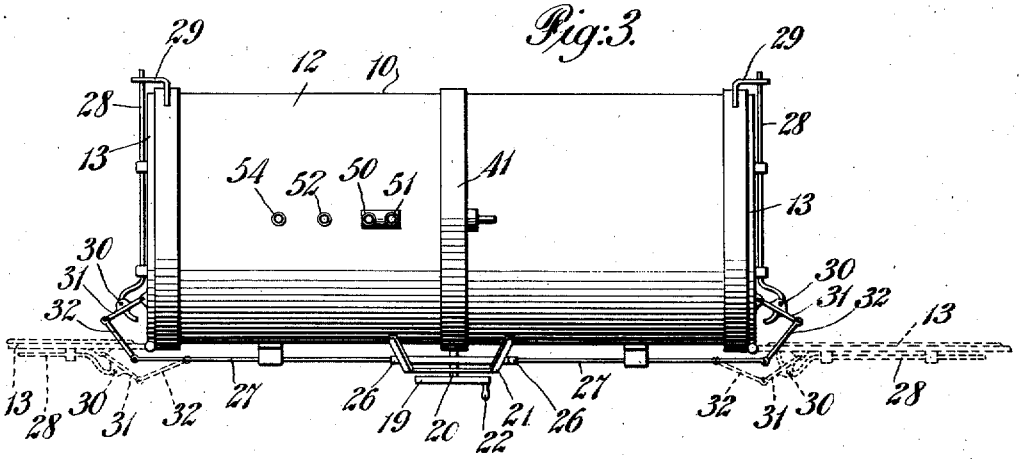
Fig. 3 is a plan view thereof.
Figure 4:
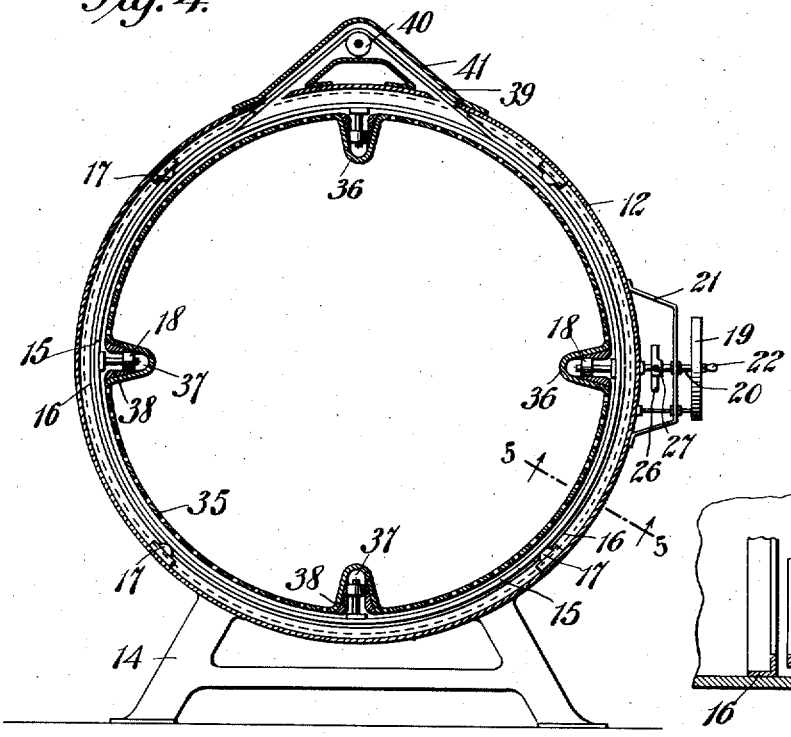
Fig. 4 is a transverse sectional view taken substantially on the line 4—4 of Fig. 2.
Figure 5:
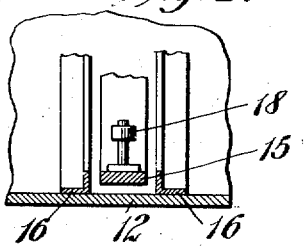
Fig. 5 is a transverse sectional view taken substantially on the line 5—5 of Fig. 4.
Figure 6:
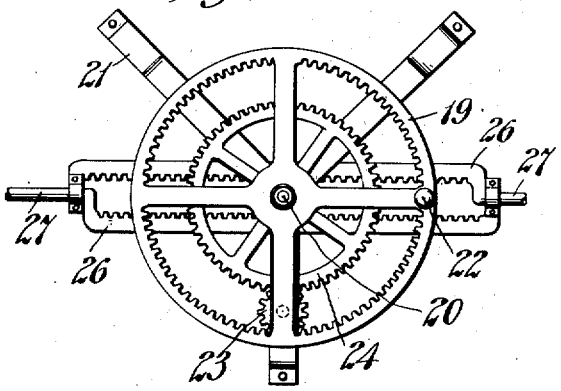
Figs. 6 and 7 are detailed views of the mechanism for opening and closing the doors of the casing.
Figure 7:
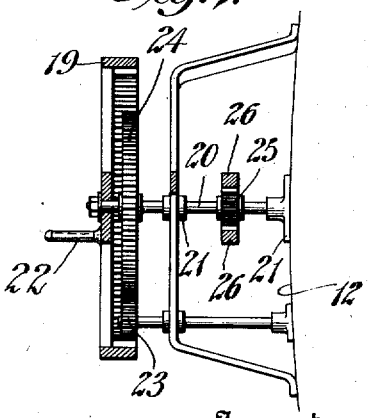

Referring now to Fig. 1, it will be apparent that the present apparatus comprises generally a substantially cylindrical container 10 and bogies or trucks 11. The container 10 is capable or having a foraminous clothes-cylinder 35 introduced therein, which cylinder contains the clothes to be washed, boiled, rinsed and dried. To this end means are employed on each of the bogies or trucks 11 which cooperate with parts of said clothes-cylinder whereby the latter may be transferred from the bogie to said container or from said container to the bogie as desired. The means by which the transfer of the clothes-cylinder is effected will be set forth more fully hereinafter. The casing 10 includes an outer shell 12 having doors 13, 13 at opposite ends. The shell rests on suitable supports or standards 14. Arranged interiorly of the shell 12 are annular members 15 which are held against displacement by members 16 attached to the outer shell. Each of the members 15 is capable of rotation on anti-friction devices as indicated at 17. Each of the annular members 15 carry rollers 18 which are rotatable on studs or similar supports as indicated in Fig. 4. In the present instance four rollers are shown, arranged in pair diametrically opposite each other.

The doors 13, 13 are provided with mechanism whereby they may be opened and closed simultaneously by the operation of the following apparatus: An internal gear 19 rotatable on a shaft 20 which is mounted in suitable bearings 21, has attached thereto a suitable crank handle 22. If desired, the outer surface of the gear 19 may engage a belt driven by a suitable pulley. An idler gear 23 is in mesh with the teeth of the gear 19 and with the teeth of a gear 24 which is fixed on the shaft 20. This arrangement gives a certain leverage and facilitates more rapid rotation of the shaft 20. The shaft 20 also has fixed thereto a gear 25 which meshes with the teeth of two rack members 26, 26, each of which is connected to a rod 27. Each door 13 is provided with a bar 28 which is slidable in suitable bearings on said door and one end of which is adapted to engage an opening in a plate 29. The opposite end of each of said bars is connected as indicated at 30 with pivotally mounted members 31; said members are connected respectively with the rods 27 above referred to by links 32. Each of said doors is hinged as indicated at 33. It will now be manifest that by rotating the gear 19 and by virtue of its connection with the parts above mentioned, the respective racks 26 will be moved longitudinally to open and close the doors on the opposite ends of the shell 12, and when in their closed position said doors are held locked by the bars 28 which are in engagement with the plates 29.

The apparatus as above stated includes a clothes-cylinder 35 which is preferably made of foraminated material, and is so formed as to provide internal agitating members 36 of which there are four in number, arranged in pairs at right angles. The said members 36 are formed to extend toward the axis of the cylinder 35, and the recesses thereby formed on the outside of the cylinder provide ways 37, each of which is provided with traction surfaces 38, 38. The construction of the clothes-cylinder, therefore, is such that it may be supported upon the rollers 18 carried by the annular members 15. It follows that the clothes-cylinder 35 will not only be rotated with the members 15, but the same may be moved longitudinally with respect to the shell, the same being supported on the rollers 18. The clothes-cylinder is axially rotated by means of a belt or cable 39 which passes over a driven pulley 40. The belt or cable 39 passes through suitable openings in the shell 12 and around one of the annular members 15, said annular member being of sufficient width to engage said belt. In order to prevent the escape of steam and water, a casing or housing 41 is employed which encloses the runs of the belt or cable and the pulley 40, as shown in Fig. 4.

Inasmuch as the clothes-cylinder, when loaded, is of considerable weight, it has been found necessary to employ the bogies 11. Each bogie is provided with rollers 45 located similarly relative to each other as are the rollers 18. These rollers are so disposed that when the bogie is brought in proper juxtaposition to the shell 12 the clothes-cylinder may be transferred from the rollers 45 of the bogie to the rollers 18 on the annular members 15, or vice versa from the rollers 18 to the rollers 45 of the bogie as the case may be.

The washing, boiling, rinsing and drying of the clothes is accomplished in part by virtue of the pipes 50, 51, 52, 53 and 54. The pipes 50 and 51, respectively, serve for the introduction of hot and cold water; the pipe 52 serves for the introduction of steam; the pipe 53 serves as an outlet for the water and sediment; and the pipe 54 is connected with a suitable vacuum pump or device for producing a substantial degree of vacuum within the container 10.

The method of utilizing the above described apparatus for washing or cleansing clothes and similar articles is preferably accomplished in the following way: The hot and cold water, if the latter is used, may be introduced through the pipes 50 and 51, and the clothes-cylinder having been set in motion through the rotation of the pulley 40 and the belt 39, the clothes are thoroughly agitated by being tumbled about within the clothes-cylinder 35. After the washing has proceeded to the necessary point steam is allowed to enter through the pipe 52, so that the articles being washed and the water contained therein will be heated up to substantially the boiling point of water. After this steam is shut off the vacuum apparatus is utilized to produce a partial vacuum within the casing 10. This will cause the heated moisture within the container to vaporize as the pressure is reduced and the vapors will consequently be withdrawn through the vacuum pipe 54. All parts of the linen being washed will be exposed to the action of the water, steam and vacuum because the clothes-cylinder is caused to continually revolve throughout the various steps of the process above described. The articles thus treated when removed from the clothes-cylinder will be ready for finishing and require very little shaking out because they have not been compressed in extractors as has heretofore been the custom.

It will now be manifest that by reason of the utilization and employment of the parts above described handling of the clothes for washing the same is greatly facilitated, and the several operations by which clothes are cleansed may be carried out continuously, while at the same time all of the materials used in washing are at no time in contact with the air, thus avoiding the escape of steam vapors and foul odors.

What is claimed is:

1. Apparatus for washing clothes and similar articles comprising, in a single apparatus, means for combining in one continuous operation the acts of washing, rinsing, tumbling and drying, said means comprising an outer casing having an opening in a vertical end thereof, a closure for said opening, an inner foraminous container capable of passing through said opening into said casing, means for rotating said container in operative position within said casing on a substantially horizontal axis, said casing having openings through which washing and heating fluids may be introduced therein and air withdrawn therefrom while said container is within said casing.

2. Washing apparatus comprising an outer cylindrical casing having an opening therein of substantially the same size as the transverse dimension of said casing, a movable closure adapted to hermetically close said opening, an inner foraminous container adapted to be bodily inserted and removed longitudinally through said opening, supporting means for said container permitting axial movement thereof and adapted to rotate said container on a substantially horizontal axis, and means for introducing cleaning fluids into said casing.

3. Washing apparatus comprising an outer horizontal cylindrical casing, a movable door forming an end wall of said casing and adapted to hermetically close said casing, an inner substantially cylindrical foraminous container adapted to be bodily inserted and removed through the end of said casing, rotatable supports for said container carried on the interior surface of said casing, means for rotating said container and supports on a substantially horizontal axis, and means for introducing cleaning fluids into said casing.

4. Washing apparatus, comprising an outer horizontal cylindrical casing, a movable door forming an end wall of said casing and adapted to hermetically close said casing, an inner substantially cylindrical foraminous container adapted to be bodily inserted and removed through the end of said casing, annular rotatable supports carried on the interior surface of said casing, means for rotating one of said supports on a substantially horizontal axis, and means for introducing cleaning fluids into said casing.

5. A washing machine comprising an outer cylinder having opposite hermetically closable but movable ends, an inner container adapted to be inserted longitudinally through said end and rotatable about a horizontal axis, and means for rotating said inner container within said outer cylinder.

6. A washing machine comprising in combination an outer stationary cylinder having hermetically closable opposite ends, an inner container adapted to be inserted longitudinally through said ends and rotatable about a horizontal axis, doors for closing the opposite ends of said outer stationary cylinder, and supporting means for said container permitting axial movement thereof and adapted to rotate said inner container when said doors are closed.

7. A washing machine comprising in combination an outer stationary cylinder, an inner container, doors for hermetically closing the opposite ends of said outer cylinder said container being adapted to be inserted longitudinally through said ends and rotatable about a horizontal axis, and carriers within said outer cylinder rotatable about a horizontal axis and adapted to receive and to rotate with said inner container.

8. A washing machine comprising in combination an outer stationary cylinder, a longitudinally movable inner foraminous container rotatable about a horizontal axis, means for hermetically and movably closing the ends of said cylinder, annular members in the outer cylinder rotatable about a horizontal axis, and means carried by said annular members and engaging said rotatable container to connect them together while rotating.

9. A washing machine comprising a stationary cylinder, an inner foraminous rotatable container, rotatable ring members between said stationary cylinder and said inner container, rollers carried by said ring members, and longitudinal bearings provided on said inner container for said rollers, said ring members and rollers being adapted to rotatably carry said inner container and also to cooperate with said longitudinal bearings to permit the removal of said container.

10. A washing machine comprising in combination an outer stationary cylinder having movable ends, an inner foraminous rotatable container, annular rotatable members mounted in said cylinder, agitating means interiorly of said inner container, tracks carried on said inner foraminated container, and rollers on said annular rotatable members, adapted to engage said tracks.

11. A washing machine comprising in combination a stationary cylinder, an inner rotatable longitudinally movable container, annular ring members mounted in said cylinder, rollers carried on said ring members, and agitators formed interiorly of said inner container, said agitators having exterior grooves adapted to form traction means for said rollers to allow longitudinal movement of said container.

12. A washing machine comprising in combination an outer stationary cylinder having movable ends, an inner foraminous container, agitating projections interiorly of said inner container, exterior traction surfaces provided on said inner container, rotatable ring members between said inner container and outer cylinder, rollers carried on said ring members and adapted to cooperate with said traction surfaces, and centrally located driving means acting in conjunction with one of said ring members to rotate said inner container when enclosed in said outer cylinder in operative position.

13. A washing machine comprising in combination an outer stationary cylinder having movable ends, an inner foraminous longitudinally slidable and rotatable container, rotatable members mounted interiorly of said cylinder and cooperating with said container, driving means outside of said cylinder, and a belt connected therewith and which passes around one of said rotatable members for rotating said container within said cylinder.

14. A washing machine comprising in combination an outer casing and a rotatable inner container having exterior grooves formed therein, closures at the ends of said casing, ring members positioned interiorly of the outer casing and exteriorly of the inner container, interior projections on said ring members adapted to be inserted into said grooves, driving means mounted on said outer casing, and means for operatively connecting said driving means with said rotatable inner container through the rotatable ring members.

15. A washing machine comprising a shell having doors at the opposite ends thereof, bodily movable rollers on the inside of said shell, and a clothes-cylinder having traction surfaces which coact with said rollers in the movement of the clothes-cylinder into and out of said shell.

16. In a washing machine having a stationary cylinder, a foraminated clothes-cylinder, means carried by the stationary cylinder on its wall circumferentially thereof on which the clothes-cylinder rotates, said means including anti-friction devices.

17. In a washing machine having a stationary shell having closures at the opposite ends thereof capable of being moved to open the opposite ends of the shell, a foraminated clothes-cylinder having agitating members interiorly thereof and ways and traction surfaces, the said clothes-cylinder being rotatably mounted when disposed interiorly of said shell, and supporting means including rollers which are accommodated by said ways and traction surfaces, the rollers and traction surfaces coacting to allow the longitudinal movement of the clothes-cylinder with respect to the shell.

18. In a washing machine, a stationary shell having closures at the opposite ends thereof and capable of being moved to open the opposite ends of the shell, a clothes-cylinder having a reticulated wall, ways formed in said wall and extending longitudinally thereof, traction surfaces in said ways, members located interiorly of said shell for rotational movement, rollers carried by said members, the said clothes-cylinder being supported on said rollers when disposed in said shell, the rollers coacting with said traction surfaces for the movement of said clothes-cylinder on said rollers.

Signed at San Juan, Porto Rico, this 2nd day of Sept. 1925.

JAMES DRAPER.